United States Patent [19]
Ohmori et al.

[11] Patent Number: 6,130,793
[45] Date of Patent: *Oct. 10, 2000

[54] THERMAL ASPERITY DETECTION METHOD, THERMAL ASPERITY COMPENSATION METHOD, MAGNETIC DISK UNIT AND RETRY METHOD THEREFOR

[75] Inventors: Hideki Ohmori; Masahide Kanegae; Isamu Tomita, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/822,426

[22] Filed: Mar. 21, 1997

[30] Foreign Application Priority Data

Sep. 30, 1996 [JP] Japan ................... 8-259875

[51] Int. Cl.$^7$ ................... G11B 5/09
[52] U.S. Cl. ................... 360/53; 360/46; 360/65; 360/67; 360/25
[58] Field of Search ................... 360/46, 72.1, 75, 360/53, 54, 65, 66, 67, 25; 364/724.16, 734, 724.2; 371/10.2, 40.3; 375/229; 333/18; 708/323

[56] References Cited

U.S. PATENT DOCUMENTS

| | | |
|---|---|---|
| 4,041,418 | 8/1977 | Koeth ................... 333/18 |
| 5,233,482 | 8/1993 | Galbraith et al. ................... 360/46 |
| 5,258,940 | 11/1993 | Coker et al. ................... 364/724.16 |
| 5,418,660 | 5/1995 | Sato et al. ................... 360/65 |
| 5,448,508 | 9/1995 | Ono et al. ................... 364/734 |
| 5,719,843 | 2/1998 | Nakajima et al. ................... 369/59 |
| 5,862,007 | 1/1999 | Pham et al. ................... 360/65 |
| 5,917,670 | 6/1999 | Scaramuzzo et al. ................... 360/53 |

FOREIGN PATENT DOCUMENTS

| | | |
|---|---|---|
| 6-28785 | 2/1994 | Japan . |
| 6-85612 | 3/1994 | Japan . |
| 6-111478 | 4/1994 | Japan . |
| 7-57204 | 3/1995 | Japan . |

OTHER PUBLICATIONS

IBM Technical Disclosure Bulletin, vol. 34, No. 8, Jan., 1992.

*Primary Examiner*—Alan Faber
*Attorney, Agent, or Firm*—Greer, Burns & Crain, Ltd.

[57] ABSTRACT

A thermal asperity detection method includes the steps of (a) converting an analog signal reproduced from a magnetic recording medium into a digital signal using an analog-to-digital converter, (b) detecting thermal asperity based on the digital signal, and (c) automatically recognizing and managing detection of the thermal asperity by the step (b) by firmware.

13 Claims, 14 Drawing Sheets

FIG. 14

| NO. OF STEPS | SETTING OF DIGITAL HPF 44 | | READ/WRITE PARAMETERS | | | | |
|---|---|---|---|---|---|---|---|
| | SET NO. OF STAGES | CONTENTS OF ENABLE REGISTER 53 | SENSE CURRENT | OFFSET AMOUNT | Fc OF ANALOG FILTER 42 | BOOST OF ANALOG FILTER 42 | VITERBI SLICE LEVEL |
| 1 | 8 STAGES | 1 (ENABLE) | +5% | +0.4 μm | 0% | 0% | 0% |
| 2 | 16 STAGES | 1 (ENABLE) | +5% | +0.4 μm | 0% | 0% | 0% |
| 3 | 32 STAGES | 1 (ENABLE) | +5% | +0.4 μm | 0% | 0% | 0% |
| 4 | 8 STAGES | 1 (ENABLE) | +5% | −0.4 μm | 0% | 0% | 0% |
| 5 | 16 STAGES | 1 (ENABLE) | +5% | −0.4 μm | 0% | 0% | 0% |
| 6 | 32 STAGES | 1 (ENABLE) | +5% | +0.4 μm | 0% | 0% | 0% |
| 7 | 8 STAGES | 1 (ENABLE) | +5% | +0.4 μm | +5% | 0% | 0% |
| 8 | 16 STAGES | 1 (ENABLE) | +5% | +0.4 μm | +5% | 0% | 0% |
| 9 | 32 STAGES | 1 (ENABLE) | +5% | +0.4 μm | +5% | 0% | 0% |
| ... | ... | ... | ... | ... | ... | ... | ... |
| 63 | 32 STAGES | 1 (ENABLE) | +10% | −0.4 μm | +5% | 0% | +5% |

6,130,793

THERMAL ASPERITY DETECTION METHOD, THERMAL ASPERITY COMPENSATION METHOD, MAGNETIC DISK UNIT AND RETRY METHOD THEREFOR

BACKGROUND OF THE INVENTION

The present invention generally relates to thermal asperity detection methods, thermal asperity elimination methods, magnetic disk units and retry methods therefor. More particularly the present invention relates to a method of detecting thermal asperity in a magnetic disk unit, a method of eliminating the thermal asperity, a magnetic disk unit having means for detecting and eliminating the thermal asperity, and a retry method which carries out a retry by detecting the thermal asperity in the magnetic disk unit.

Recently, a magnetic disk unit having a magneto resistance effect type (MR) head which uses a magneto resistance (MR) element has been proposed. In addition, as the recording density of a magnetic disk increased, the floating distance by which the MR head floats from the magnetic disk has become smaller. For this reason, the MR head may hit a projection, that is, a defect, inevitably existing on the magnetic disk. When the MR head hits such a projection on the magnetic disk, heat is generated by friction, and a signal waveform reproduced from the magnetic disk by the MR head fluctuates due to the generated heat. Such a phenomenon is referred to as "thermal asperity".

The memory capacity of the magnetic disk unit has increased in recent years, and the increased memory capacity is mainly due to the increased recording density of the magnetic disk. In order to increase the recording density of the magnetic disk, there is a method of increasing the number of data tracks in a radial direction of the magnetic disk, and there is a method of increasing the recording density in a circumferential direction of the magnetic disk.

The MR head is suited for use with the magnetic disk using the latter method to increase the recording density. In addition, in order to further increase the recording density, there are proposals to reduce the floating distance of the MR head from the surface of the magnetic disk so that the signal-to-noise (S/N) ratio of an output of the MR head is increased.

The MR head has a characteristic such that the electrical resistance of the MR head changes depending on changes in an external magnetic field. Utilizing this characteristics of the MR head, the MR head reads magnetizations on the magnetic disk as voltage signals by applying a constant current to the MR element. Further, unlike an inductive type head, the MR head can easily read signals even while the magnetic disk rotates at a low speed, and the MR head is thus suited for use in the magnetic disk unit to increase the memory capacity and to reduce the size of the magnetic disk unit.

However, when the floating distance of the MR head from the surface of the magnetic disk is reduced in order to increase the recording density on the magnetic disk, the MR head hits projections, that is, defects, inevitably existing on the magnetic disk. When the MR head hits such a projection, the thermal resistance of the MR element changes, that is, increases, due to the heat generated by the friction. When the thermal resistance of the MR element increases, the signal waveform reproduced from the magnetic disk by the MR head fluctuates, thereby causing the thermal asperity. More particularly, when the thermal asperity occurs, a sudden change occurs in a D.C. component of the signal waveform reproduced from the magnetic disk, and it becomes impossible to correctly reproduce data recorded on the magnetic disk.

Conventionally, there was a proposed method which takes measures to suppress the undesirable effects of the thermal asperity by detecting the thermal asperity and increasing an input dynamic range of an analog-to-digital (A/D) converter within a data read part. According to this proposed method, the operations of a phase locked loop (PLL) and an automatic gain control (AGC) loop within the data read part are held, and a cutoff frequency of an A.C. coupling of the input of the data read part is increased. This proposed method is disclosed in a Japanese Laid-Open Patent Application No.6-28785, for example.

However, according to the conventional measures taken against the thermal asperity, there was a problem in that it is impossible to completely eliminate the sudden change in the D.C. component of the signal waveform reproduced from the magnetic disk. In addition, when carrying out a retry of the read operation after detecting the thermal asperity, it was necessary to carry out 3 operations, namely, holding the operations of the PLL and the AGC loop, increasing the input dynamic range of the A/D converter and increasing the cutoff frequency of the A.C. coupling of the input of the data read part. As a result, there was also a problem in that a complicated control is required.

Furthermore, when the operations of the PLL and the AGC are held, it is impossible to follow the data during the hold time. But since a deviation of the signal level from a target value and an error in the sampling phase will cause data error, it was necessary to minimize the hold time. On the other hand, when the input dynamic range of the A/D converter is increased, the resolution deteriorated. Moreover, an analog circuit that is used to carry out a switching when increasing the cutoff frequency of the A.C. coupling at the input of the data read part is in general easily affected by noise, and it was essential to take measures against the noise.

SUMMARY OF THE INVENTION

Accordingly, it is a general object of the present invention to provide a novel and useful thermal asperity detection method, thermal asperity elimination method, magnetic disk unit and retry method therefor, in which the problems described above are eliminated.

Another and more specific object of the present invention is to provide a thermal asperity detection method which can positively detect the thermal asperity, a thermal asperity elimination method which can positively detect and eliminate the thermal asperity, a magnetic disk unit which positively detects and eliminates the thermal asperity, and a retry method applicable to such a magnetic disk unit.

Still another object of the present invention is to provide a thermal asperity detection method comprising the steps of (a) converting an analog signal reproduced from a magnetic recording medium into a digital signal using an analog-to-digital converter, (b) detecting thermal asperity based on the digital signal, and (c) automatically recognizing and managing detection of the thermal asperity by the step (b) by firmware. According to the thermal asperity detection method of the present invention, it is possible to positively detect the thermal asperity.

A further object of the present invention is to provide a thermal asperity elimination method comprising the steps of (a) converting an analog signal reproduced from a magnetic recording medium into a digital signal using an analog-todigital converter, (b) eliminating a D.C. component caused by thermal asperity included in the analog signal using a digital filter which detects the D.C. component after the step (a). According to the thermal asperity elimination method of the present invention, it is possible to positively eliminate the thermal asperity. In addition, it is possible to suppress undesirable effects of noise because a digital signal processing is carried out.

Another object of the present invention is to provide a magnetic disk unit comprising analog-to-digital converter means for converting an analog signal reproduced from a magnetic disk into a digital signal, and a digital filter eliminating a D.C. component caused by thermal asperity included in the analog signal from an output of the analog-to-digital converter means. According to the magnetic disk unit of the present invention, it is possible to positively eliminate the thermal asperity. In addition, it is possible to suppress undesirable effects of noise because a digital signal processing is carried out.

Still another object of the present invention is to provide a retry method for an apparatus which includes analog-to-digital converter means for converting an analog signal reproduced from a magnetic recording medium into a digital signal, and a digital filter eliminating a D.C. component caused by thermal asperity included in the analog signal from an output of the analog-to-digital converter means, comprising the steps of (a) detecting a data error based on the digital signal, (b) detecting the thermal asperity based on the digital signal, and (c) carrying out a read retry process based on whether or not the thermal asperity is detected when the data error is detected. According to the retry method of the present invention, it is possible to simultaneously realize a retry process and elimination of the thermal asperity.

Other objects and further features of the present invention will be apparent from the following detailed description when read in conjunction with the accompanying drawings.

BRIEF DESCRIPTION OF THE DRAWINGS

FIG. 14 is a diagram for explaining a thermal asperity retry process in FIG. 13.

DESCRIPTION OF THE PREFERRED EMBODIMENTS

A description will be given of an embodiment of a magnetic disk unit according to the present invention. This embodiment of the magnetic disk unit employs an embodiment of a thermal asperity detection method according to the present invention, an embodiment of a thermal asperity elimination method according to the present invention, and an embodiment of a retry method according to the present invention.

Figure 1:
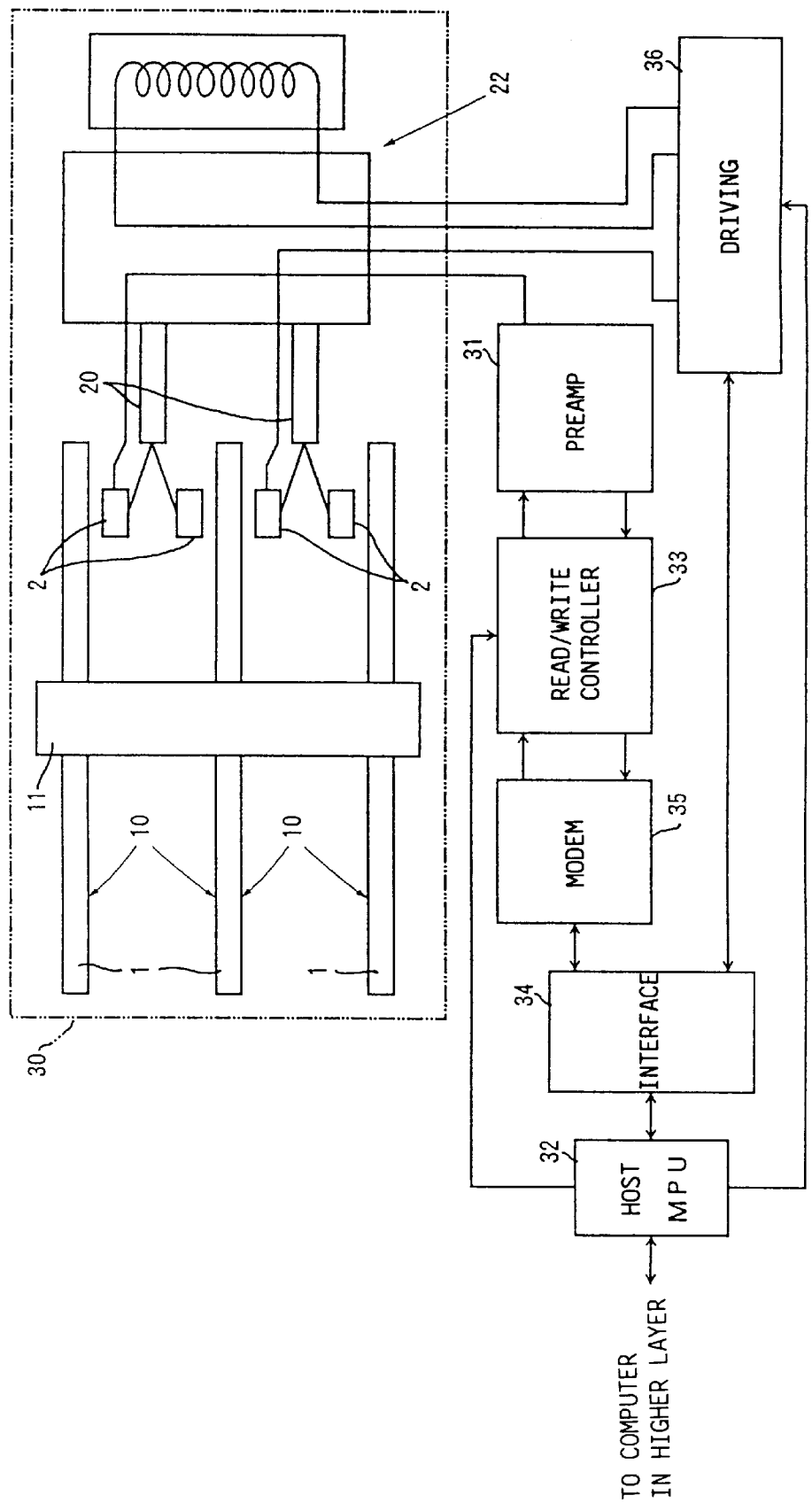
FIG. 1 is a system block diagram generally showing the construction of an embodiment of a magnetic disk unit according to the present invention.

FIG. 1 shows the general construction of this embodiment of the magnetic disk unit. The magnetic disk unit generally includes a disk mechanical part 30, a preamplifier circuit 31, a host microprocessor unit (MPU) 32, a read/write controller 33, an interface circuit 34, a modulator/demodulator (modem) circuit 35, and a driving circuit 36 which are connected as shown in FIG. 1. The disk mechanical part 30 generally includes a spindle 11 which is rotated by a spindle motor (not shown), magnetic disks 1 fixed to the spindle 11, heads 2 supported on head actuators 20, and a carriage part 22 including a voice coil motor (VCM, not shown). In this embodiment, it is assumed for the sake of convenience that 3 magnetic disks 1 and 4 heads 2 are provided within the disk mechanical part 30.

The basic construction of the magnetic disk unit itself shown in FIG. 1 is known. For this reason, illustration and detailed description related to internal structures of the various parts of the magnetic disk unit will be omitted in this specification.

Among the plurality of magnetic disks 1, servo information is recorded on a surface 10 of one magnetic disk 1 and data are recorded on a surface 10 of another magnetic disk 1, for example.

The host MPU 32 controls each part of the magnetic disk unit, and controls data and commands exchanged between the host MPU 32 and a computer (not shown) in a higher layer or level. The read/write controller 33 controls the read/write of data with respect to the disk mechanical part 30 via the preamplifier circuit 31, based on instructions from the host MPU 32. A reproduced signal output from the read/write controller 33 is supplied to the host MPU 32 via the modem circuit 35 and the interface circuit 34.

The driving circuit 36 drives and controls the carriage part 22 in response to a seek command from the host MPU 32, and controls positioning of the heads 2 within the disk mechanical part 30.

Figure 2:
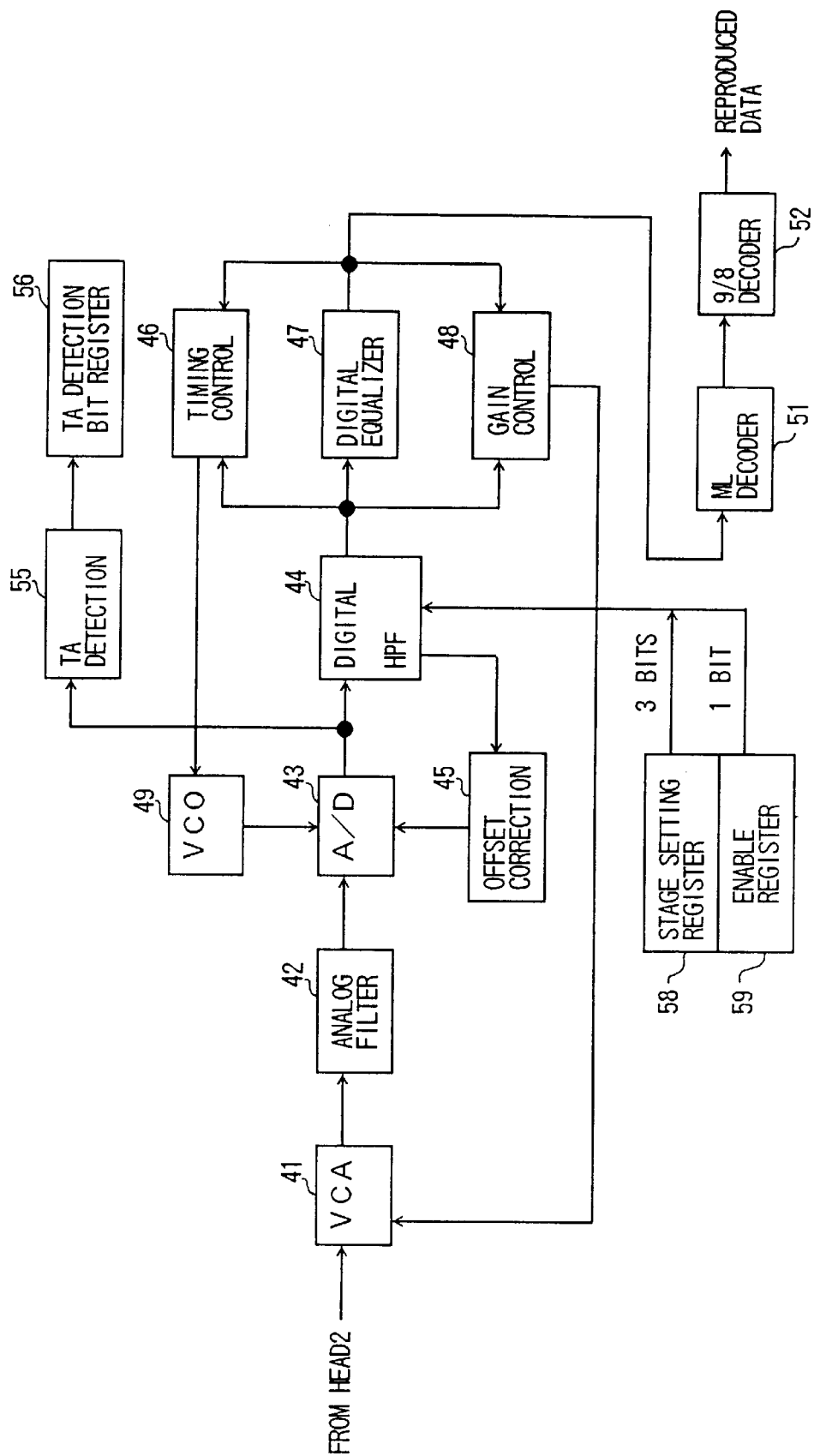
FIG. 2 is a system block diagram showing an important part of the magnetic disk unit shown in FIG. 1.

FIG. 2 shows an important part of the magnetic disk unit shown in FIG. 1. FIG. 2 shows only a reproducing system which is directly related to the subject matter of the present invention and is within a circuit part made up of the preamplifier circuit 31, the read/write controller 33 and the modem circuit 35. This reproducing system employs a partial response maximum likelihood (PRML) technique.

The reproducing system includes a voltage controlled amplifier 41, an analog filter 42, an A/D converter 43, a digital highpass filter 44, an offset correction circuit 45, a timing control circuit 46, a digital equalizer 47, a gain control circuit 48, a voltage controlled oscillator 49, a maximum likelihood (Viterbi demodulator) circuit 51, a 9/8 decoder 52, a thermal asperity (TA) detection circuit 55, a TA detection bit register 56, a stage setting register 58 and an enable register 59 which are connected as shown in FIG. 2.

An analog signal which is reproduced from the magnetic disk 1 by the head 2 is amplified to a most appropriate amplitude by the voltage controlled amplifier 41. A gain of this voltage controlled amplifier 41 is optimized by a feedback from the gain control circuit 48. The analog filter 42 subjects the analog signal output from the voltage controlled amplifier 41 to a partial response waveform equalization. The A/D converter 43 converts the analog signal output from the analog filter 42 into a digital signal by sampling the analog signal at an optimized sampling period determined by the timing control circuit 46 and the voltage controlled oscillator 49.

The digital highpass filter 44 obtains a D.C. component from the digital signal output from the A/D converter 43, and supplies the D.C. component to the offset correction circuit 45. In addition, the digital highpass filter 44 outputs a digital signal which is eliminated of the D.C. component. The D.C. component corresponds to the thermal asperity. The offset correction circuit 45 converts the D.C. component into a voltage. The A/D converter 43 subtracts the voltage which is received from the offset correction circuit 45 from the analog signal which is received from the analog filter 42, and carries out the A/D conversion with respect to a difference which is obtained by this subtraction. Hence, it is possible to prevent the input of the A/D converter 43 from exceeding the input dynamic range of the A/D converter 43 and saturating. For example, the input dynamic range of the A/D converter 43 is 400 $m_{pp}$, and a 6-bit two's complement is output from the A/D converter 43.

The output digital signal of the digital highpass filter 44 is supplied to the timing control circuit 46, the gain control circuit 48 and the digital equalizer 47. The digital equalizer 47 is provided to finely adjust the waveform equalization. The digital signal output from the digital equalizer 47 is supplied to the timing control circuit 46, the gain control circuit 48 and the maximum likelihood (ML) decoder circuit 51. The timing control circuit 46 generates a signal for controlling a sampling timing, that is, a sampling period of the A/D converter 43 via the voltage controlled oscillator 49, based on the output digital signal of the digital highpass filter 44 and the output digital signal of the digital equalizer 47. The gain control circuit 48 generates a signal for controlling the gain of the voltage controlled amplifier 41 based on the output digital signal of the digital highpass filter 44 and the output digital signal of the digital equalizer 47. For example, a method proposed in a Japanese Laid-Open Patent Application No.6-111478 may be used as the method of adjusting the gain using the gain control circuit 48.

The ML decoder circuit 51 decodes the output digital signal of the digital equalizer 47 and generates serial data. In addition, the 9/8 decoder 52 decodes and converts the serial data from the ML decoder circuit 51 into parallel data. The parallel data are supplied to the host MPU 32 as reproduced data via the interface circuit 34 shown in FIG. 1.

The TA detection circuit 55 detects the thermal asperity by detecting abnormal amplitudes of the same polarity from the output digital signal of the AID converter 43. A circuit having a known construction may be used for this TA detection circuit 55, and for example, it is possible to use the circuit proposed in a Japanese Laid-Open Patent Application No.6-28785 as the TA detection circuit 55. When the TA detection circuit 55 detects the thermal asperity, the TA detection circuit 55 sets a TA detection bit in the TA detection bit register 56. A reference can be made to contents of the TA detection bit register 56 from the host MPU 32 shown in FIG. 1 and the computer in the higher layer. By checking the TA detection bit register 56 by firmware, it is possible to confirm whether or not the thermal asperity is generated.

The enable register 59 stores 1-bit enable information which is set when enabling the digital highpass filter 44. The enable register 59 can be set and reset from the host MPU 32 and the computer in the higher layer. Since the enable register 59 is normally reset, the digital highpass filter 44 is normally disabled so as to prevent the S/N ratio from deteriorating due to the operation of the digital highpass filter 44. On the other hand, when a read error occurs as will be described later and the thermal asperity is detected from the TA detection bit register 56, the enable register 59 is set, thereby enabling the digital highpass filter 44 and making it possible to eliminate the D.C. component.

The stage setting register 58 stores 3-bit stage setting information which sets the number of stages of a shift register forming the digital highpass filter 44. The stage setting register 58 can be set from the host MPU 32 and the computer in the higher layer. In this embodiment, the stage setting register 58 can set 3 kinds of stages by the 3-bit stage setting information, and it is possible to change the cutoff frequency of the digital highpass filter 44 by changing the number of stages set. When a data error occurs and the thermal asperity is detected from the TA detection bit register 56, a read retry is carried out. If a data error occurs again during this read retry, the stage setting information within the stage setting register 58 is changed by firmware.

Figure 3:
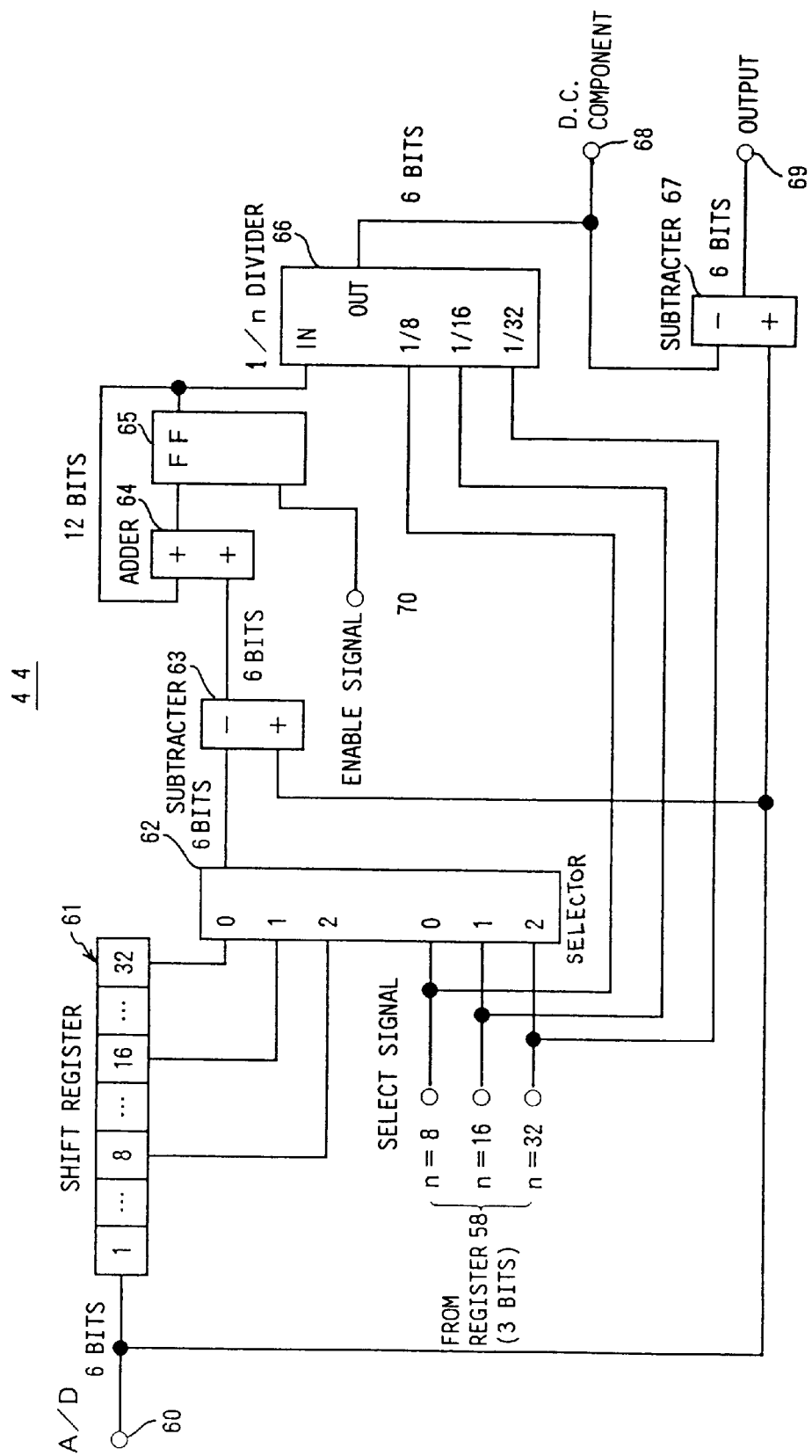
FIG. 3 is a system block diagram showing an embodiment of a digital highpass filter.

FIG. 3 shows an embodiment of the digital highpass filter 44. The digital highpass filter 44 includes a shift register 61, a selector 62, a subtracter 63, an adder 64, a flip-flop 65, a 1/n divider 66 and a subtracter 67 which are connected as shown in FIG. 3.

In FIG. 3, the 6-bit digital signal output from the A/D converter 43 is input to an input terminal 60, and is successively shifted in the shift register 61 having 32 stages. The selector 62 receives 3 kinds of signals which are respectively delayed by 8, 16 and 32 stages by the shift register 61. The selector 62 also receives the 3-bit select signal (stage setting information) from the stage setting register 58 shown in FIG. 2. Hence, out of the 3 kinds of signals which are respectively delayed by 8, 16 and 32 stages by the shift register 61, 1 signal is selected by the select signal and is output from the selector 62. The output digital signal of the selector 62 is supplied to the subtracter 63. The subtracter 63 subtracts the digital signal which is received from the selector 62 from the output digital signal of the A/D converter 43 obtained directly from the input terminal 60, and obtains a difference between the two digital signals.

The adder 64 and the flip-flop 65 which are connected as shown in FIG. 3 form an accumulator which accumulates the difference obtained by the subtracter 63. The flip-flop 65 is enabled in response to an enable signal (enable information) from the enable register 59 shown in FIG. 2. An accumulated result obtained by the accumulator is supplied to the 1/n divider 66.

The 1/n divider 66 also receives the 3-bit select signal from the stage setting register 58 shown in FIG. 2. Accordingly, if n=8 is selected by the selector 62, the 12-bit accumulated result from the accumulator is subjected to a bit shift of 3 bits towards the least significant bit (LSB), and a 6-bit signal which is obtained by multiplying ⅛ to the 12-bit accumulated result is output from the 1/n divider 66 by a switching carried out by a selector (not shown) within the 1/n divider 66. This 6-bit signal from the 1/n divider 66 is output from an output terminal 68 as a D.C. component of the thermal asperity, and is supplied to the offset correction circuit 45 shown in FIG. 2. On the other hand, if n=16 is selected by the selector 62, the 12-bit accumulated result from the accumulator is subjected to a bit shift of 4 bits towards the LSB, and a 6-bit signal which is obtained by multiplying ¹⁄₁₆ to the 12-bit accumulated result is output from the 1/n divider 66 by a switching carried out by the selector within the 1/n divider 66. Similarly, if n=32 is selected by the selector 62, the 12-bit accumulated result from the accumulator is subjected to a bit shift of 5 bits towards the LSB, and a 6-bit signal which is obtained by multiplying ¹⁄₃₂ to the 12-bit accumulated result is output from the 1/n divider 66 by a switching carried out by the selector within the 1/n divider 66.

The 6-bit signal output from the 1/n divider 66 is also supplied to the subtracter 67. This subtracter 67 also receives the output digital signal of the A/D converter 43 obtained directly from the input terminal 60. Thus, the subtracter 67 subtracts the D.C. component of the thermal asperity from the output digital signal of the A/D converter 43, so as to output a digital signal which is eliminated of the D.C. component. The output digital signal of the subtracter 67 is output via an output terminal 69 and is supplied to the timing control circuit 46, the digital equalizer 47 and the gain control circuit 48 shown in FIG. 2.

The enable signal supplied to the flip-flop 65 is input to a clear terminal of the flip-flop 65. Accordingly, when the enable signal is OFF, the flip-flop 65 is cleared, and the D.C. component output from the output terminal 68 is zero. In this case, the digital highpass filter 44 is disabled, and only the output digital signal of the A/D converter 43 is output from the output terminal 69.

Figure 4:
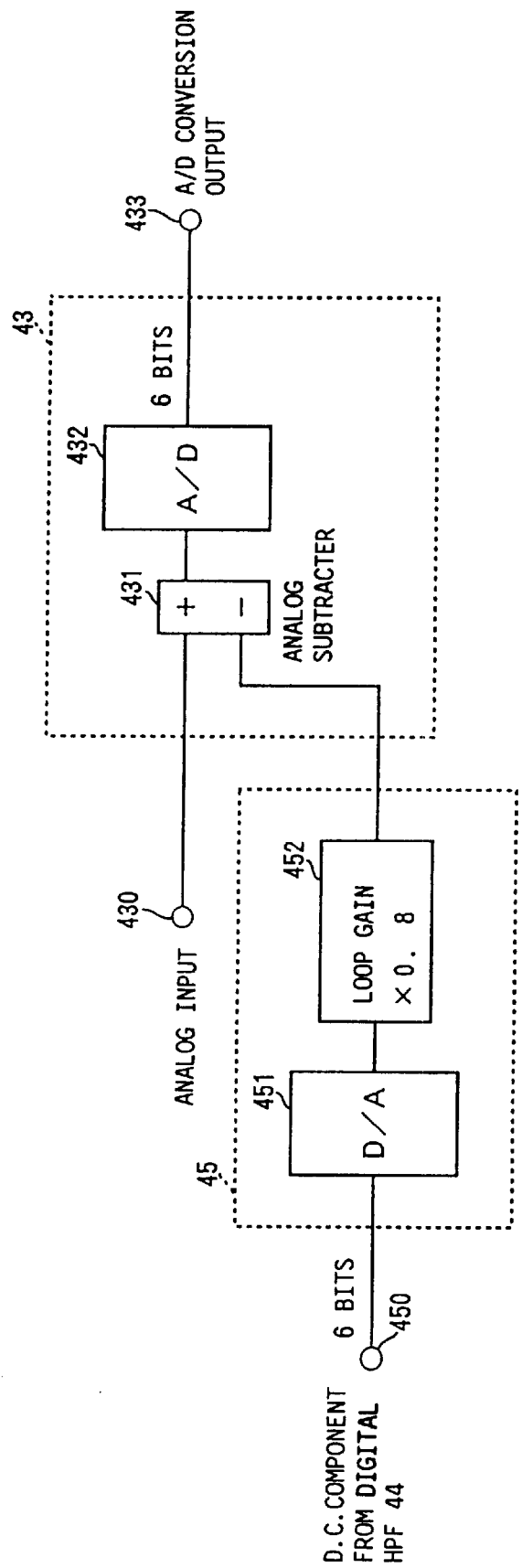
FIG. 4 is a system block diagram showing an embodiment of an offset correction circuit and an A/D converter.

FIG. 4 shows an embodiment of the offset correction circuit 45 and the A/D converter 43. The offset correction circuit 45 includes a digital-to-analog (D/A) converter circuit 451 and a loop gain circuit 452 which are connected as shown in FIG. 4. The loop gain circuit 452 has a loop gain of 0.8. On the other hand, the A/D converter 43 includes an analog subtracter 431 and an A/D converter circuit 432 which are connected as shown in FIG. 4. Of course, the loop gain of the loop gain circuit 452 is not limited to 0.8, and the loop gain may be set to an optimum value that is obtained by a simulation, for example.

The D.C. component which is obtained from the output terminal 68 of the digital highpass filter 44 is supplied to the D/A converter circuit 451 via an input terminal 450, and is converted into an analog voltage. This analog voltage is supplied to the analog subtracter 431 of the A/D converter 43 via the loop gain circuit 452. The analog subtracter 431 also receives the analog signal from the analog filter 42 shown in FIG. 2. Accordingly, the analog subtracter 431 subtracts the analog voltage which is received from the loop gain circuit 452 from the analog signal which is received from the analog filter 42, and supplies a subtraction result to the A/D converter circuit 432. A 6-bit digital signal output from the A/D converter circuit 432 is supplied to the digital highpass filter 44 shown in FIG. 2 via an output terminal 433.

In this embodiment, the input dynamic range of the A/D converter circuit 432 is 400 mV$_{pp}$, and the weight of 1 bit of the 6-bit output generated by the A/D converter circuit 432 is 6.25 mV. In addition, the D/A converter circuit 451 also generates the output of ±200 mV (500 mV$_{pp}$) using the same weight as the A/D converter circuit 432. The following Table shows a relationship of the input and the output of the D/A converter circuit 451.

TABLE

| Input | Output (mV) |
|---|---|
| 011111 | 200 |
| . | . |
| . | . |
| . | . |
| 000001 | 6.25 |
| 000000 | 0 |
| 111111 | −6.25 |
| . | . |
| . | . |
| . | . |
| 100001 | −200 |

Figure 5:
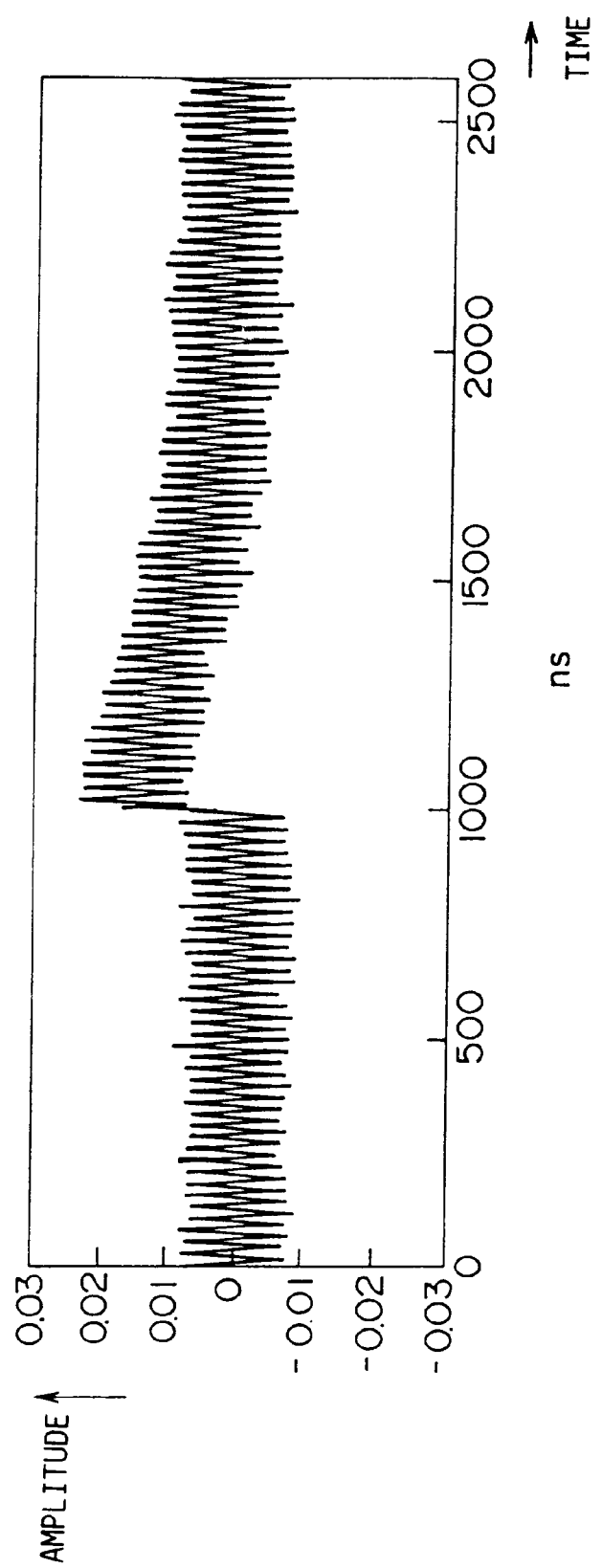
FIG. 5 is a diagram showing an analog signal reproduced by a head and input to a voltage controlled amplifier.

FIG. 5 shows the analog signal which is reproduced by the head 2 and input to the voltage controlled amplifier 41 in FIG. 2. In FIG. 5, the ordinate indicates the amplitude in arbitrary units, and the abscissa indicates the time in ns. FIG. 5 shows a case where the thermal asperity is generated from a vicinity of 1000 ns.

Figure 6:
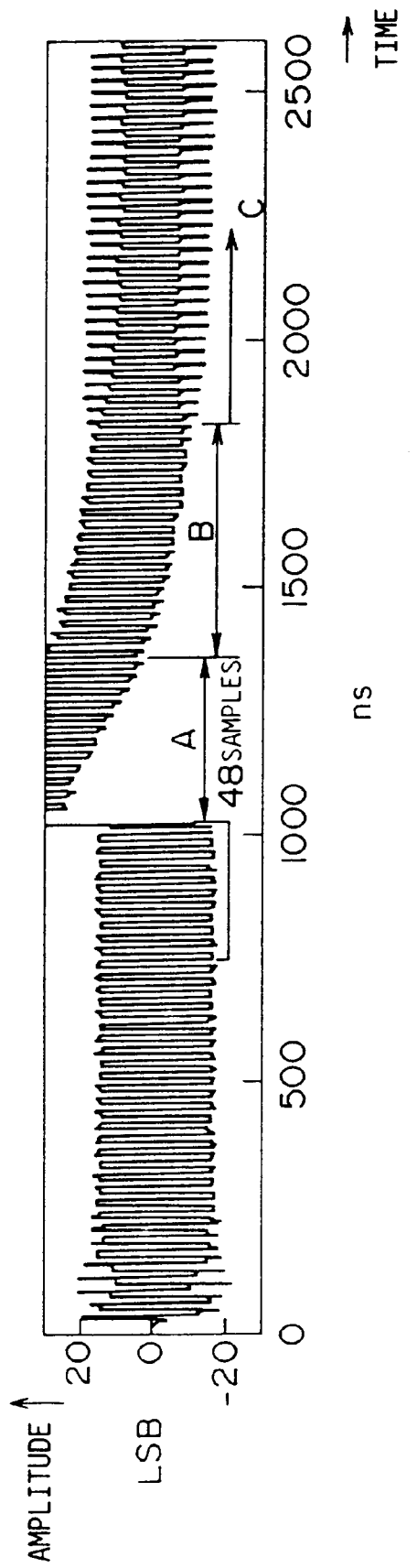
FIG. 6 is a diagram showing an output signal of the A/D converter when no measures are taken against thermal asperity and no digital highpass filter and no offset correction circuit are provided.

FIG. 6 shows the output signal of the A/D converter 43 for a case where no measure is taken against the thermal asperity and the digital highpass filter 44 and the offset correction circuit 45 shown in FIG. 2 are not provided. In FIG. 6, the ordinate indicates the amplitude in arbitrary units, and the abscissa indicates the time in ns. In this case, it can be seen from FIG. 6 that the A/D conversion saturates during a time A, the amplitude decreases during a time B as compared to that during the time A before the thermal asperity occurs, and a phase error occurs during a time C.

Figure 7:
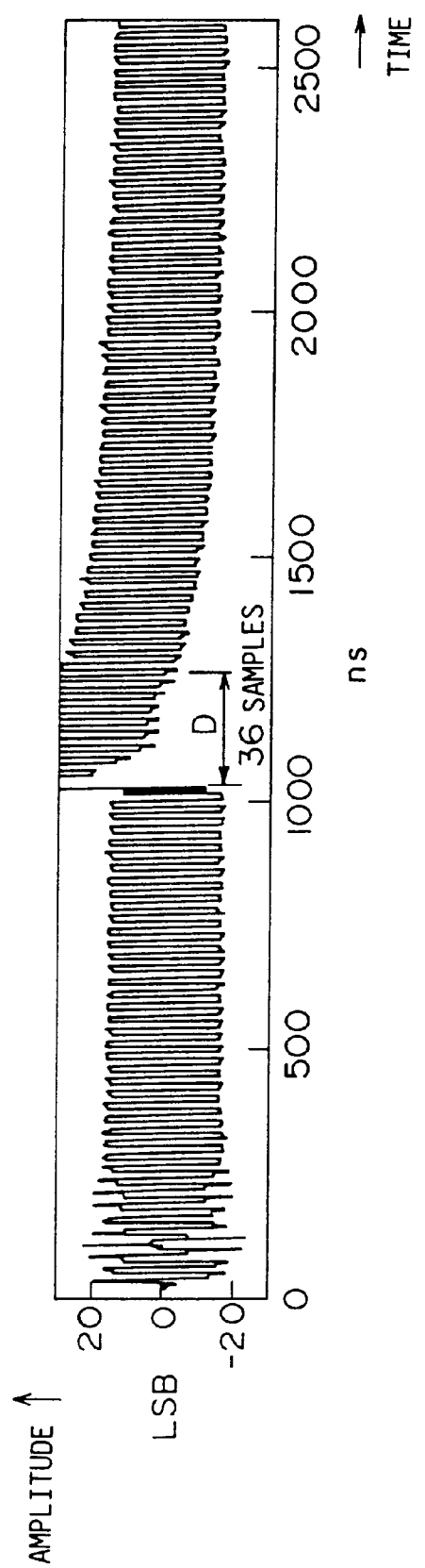
FIG. 7 is a diagram showing an output signal of the A/D converter of the embodiment of the magnetic disk unit.
Figure 8:
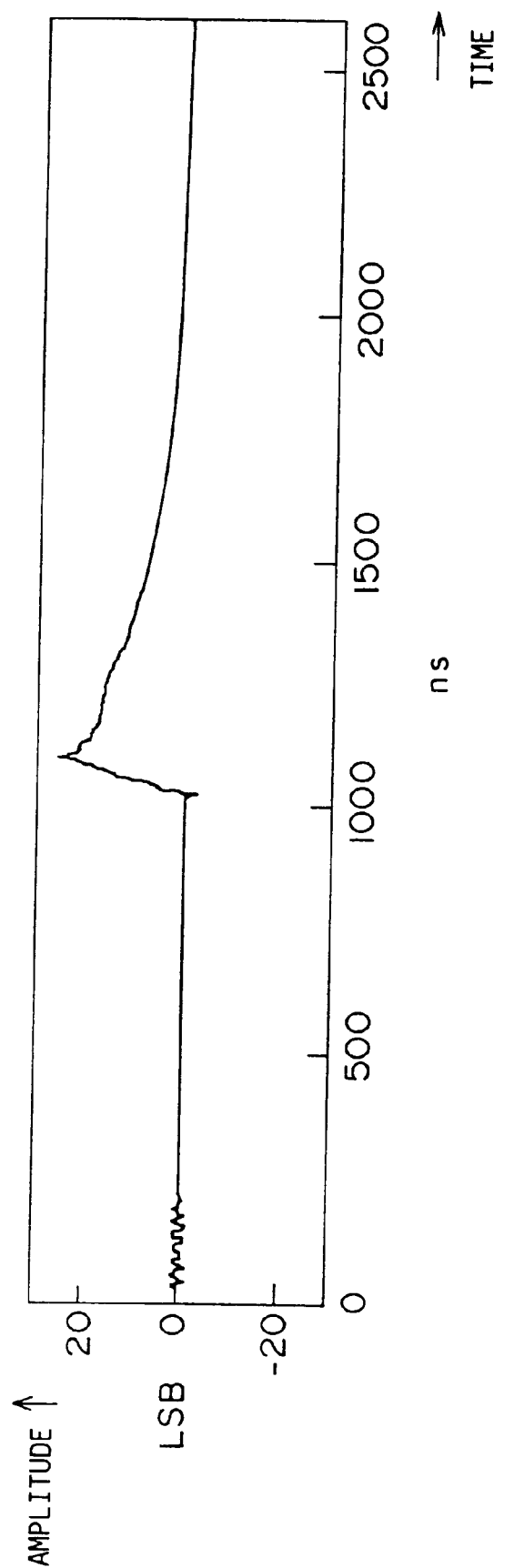
FIG. 8 is a diagram showing a D.C. component obtained by the digital highpass filter.
Figure 9:
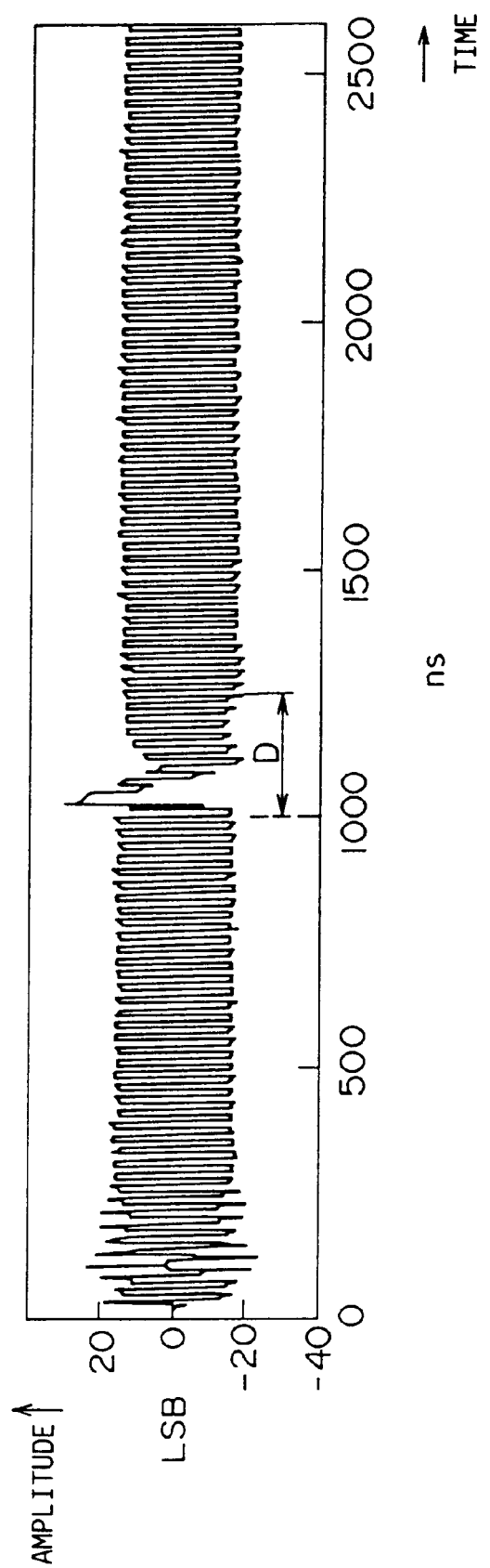
FIG. 9 is a diagram showing a signal eliminated from the D.C. component by the digital highpass filter.

On the other hand, when the digital highpass filter 44 and the offset correction circuit 45 shown in FIG. 2 are provided as in this embodiment, it was confirmed that the output signal of the A/D converter 43 becomes as shown in FIG. 7 with respect to the analog signal shown in FIG. 5. Further, it was confirmed that the D.C. component obtained from the digital highpass filter 44 becomes as shown in FIG. 8, and that the signal eliminated of the D.C. component by the digital highpass filter 44 becomes as shown in FIG. 9. In FIGS. 7 through 9, the ordinate indicates the amplitude in arbitrary units, and the abscissa indicates the time in ns.

It may be regarded that the A/D conversion is saturated during a time D in FIG. 7, and that the data reproduction cannot be made during the time D in FIG. 9. However, no amplitude decrease and no phase error is seen after the time D, and it was therefore confirmed that this embodiment is extremely effective with respect to the thermal asperity.

Figure 10:
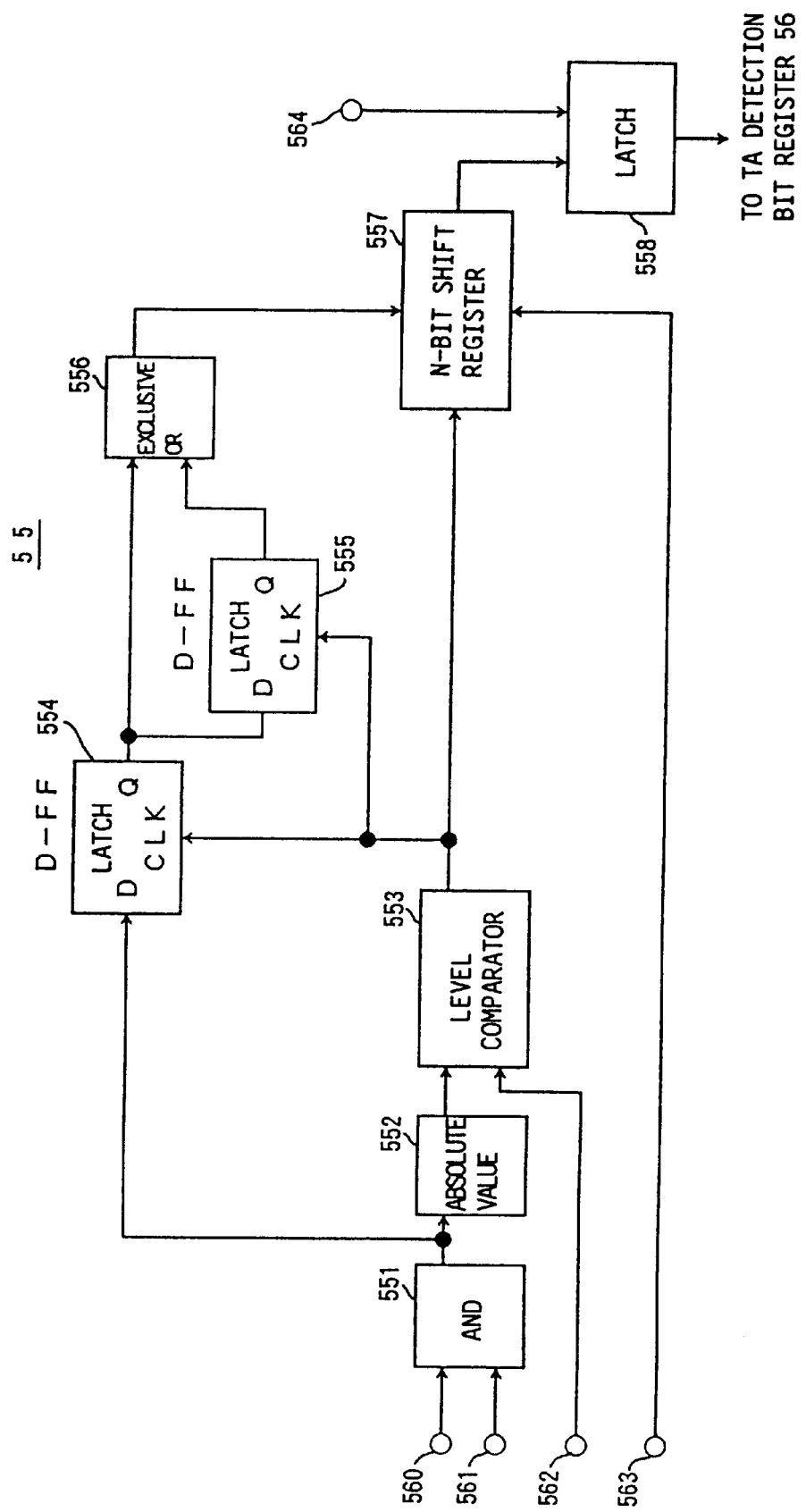
FIG. 10 is a system block diagram showing an embodiment of a thermal asperity detection circuit.

FIG. 10 shows an embodiment of the TA detection circuit 55 shown in FIG. 2. The TA detection circuit 55 includes an AND circuit 551, an absolute value circuit 552, a level comparator 553, latch circuits 554 and 555, an exclusive-OR circuit 556, a N-bit shift register 557 and a latch circuit 558 which are connected as shown in FIG. 10.

The output digital signal of the A/D converter 43 shown in FIG. 2 is input to an input terminal 560 shown in FIG. 10. On the other hand, a control signal for enabling/disabling the operation of the TA detection circuit 55 is input to an input terminal 561. This control signal may be supplied from the computer in the higher layer or the host MPU 32. Alternatively, it is also possible to supply this control signal from a register (not shown) which is accessible by and can be set from the computer in the higher layer or the host MPU 32. The AND circuit 551 obtains an AND of the signals received via the input terminals 560 and 561, and an output signal of this AND circuit 551 is supplied to the absolute value circuit 552 and the latch circuit 554. The absolute value circuit 552 obtains an absolute value of the output signal of the AND circuit 551, and supplies the absolute value to the level comparator 553. The level comparator 553 compares a TA slice level input via an input terminal 562 and the output signal (absolute value) of the absolute value circuit 552. This TA slice level may be supplied from the computer in the higher layer or the host MPU 32. Alternatively, it is also possible to supply this TA slice level from a register (not shown) which is accessible by and can be set from the computer in the higher layer or the host MPU 32. An output signal of the level comparator 553 is supplied to the N-bit shift register and to clock input terminals CLK of the latch circuits 554 and 555.

The latch circuits 554 and 555 and the exclusive-OR circuit 556 form a polarity check part. An output signal of the latch circuit 554 is supplied to the latch circuit 555 and the exclusive-OR circuit 556. In addition, an output signal of the latch circuit 555 is also supplied to the exclusive-OR circuit 556. An output signal of the exclusive-OR circuit 556 is supplied to a reset terminal of the N-bit shift register 557 as a reset pulse. The N-bit shift register 557 is reset when this reset pulse has a high level (logic value "1").

On the other hand, a N-bit setting signal input to an input terminal 563 is supplied to a clear terminal of the N-bit shift register 557. This N-bit setting signal may be supplied from the computer in the higher layer or the host MPU 32. Alternatively, it is also possible to supply this N-bit setting signal from a register (not shown) which is accessible by and can be set from the computer in the higher layer or the host MPU 32. An output signal of the N-bit shift register 557 is supplied to a set terminal of the latch circuit 558. An output signal of the latch circuit 558 is supplied to the TA detection bit register 56 shown in FIG. 2 as a TA detection bit. A TA detection bit clear signal input to an input terminal 564 is supplied to a reset terminal of the latch circuit 558. This TA detection bit clear signal may be supplied from the computer in the higher layer or the host MPU 32. Alternatively, it is also possible to supply this TA detection bit clear signal from a register (not shown) which is accessible by and can be set from the computer in the higher layer or the host MPU 32.

Figure 11:
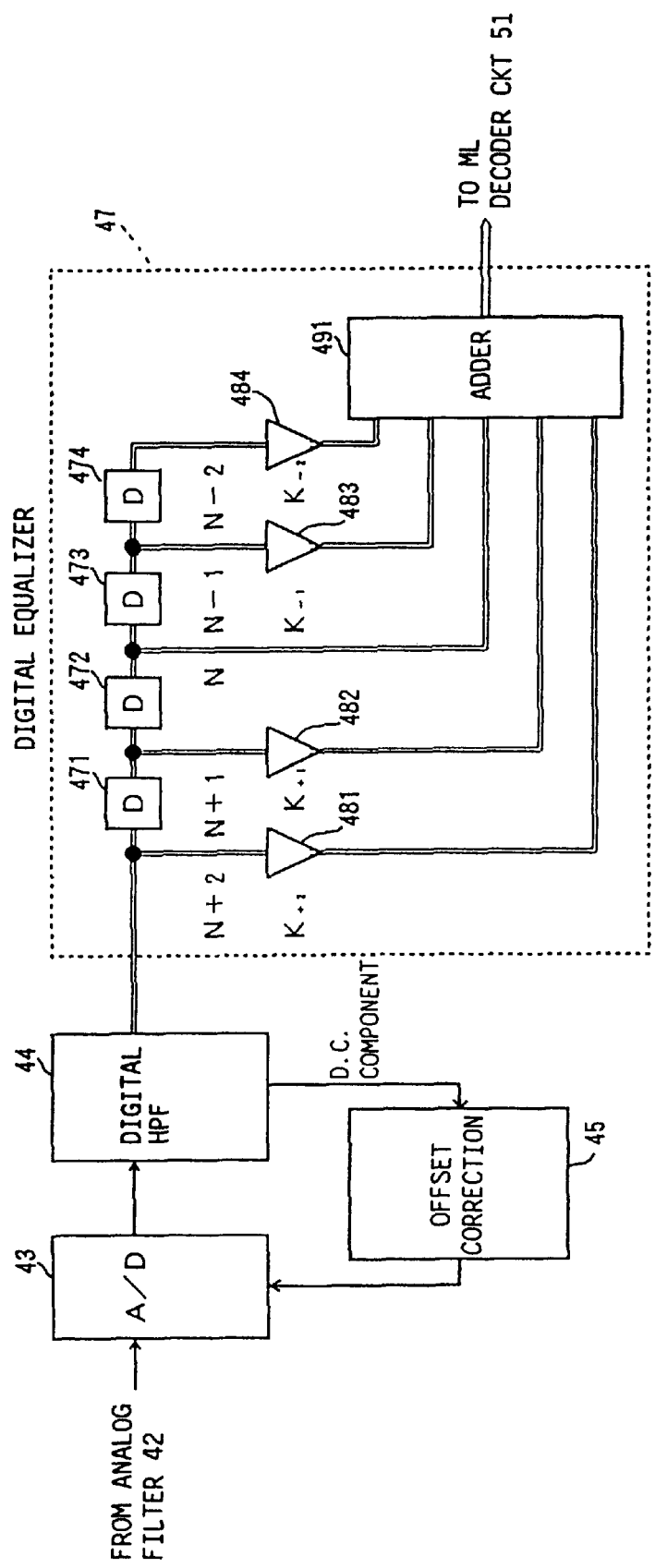
FIG. 11 is a system block diagram showing an embodiment of a digital equalizer together with a peripheral part thereof.

FIG. 11 shows an embodiment of the digital equalizer 47 together with a peripheral part thereof. In FIG. 11, those parts which are the same as those corresponding parts in FIG. 2 are designated by the same reference numerals, and a description thereof will be omitted. In this embodiment, it is assumed for the sake of convenience that the A/D converter 43 is a 6-bit A/D converter.

The digital equalizer 47 includes delay (D) flip-flops 41 through 474, coefficient multipliers 481 through 484, and an adder 491 which are connected as shown in FIG. 11. An output signal of the adder 491 is supplied to the ML decoder circuit 51 shown in FIG. 2. In FIG. 11, signal lines indicated by bold (or double) lines denote buses.

Since the D flip-flops 471 through 474 form a shift register, it would be convenient if at least a portion of the shift register within the digital highpass filter 44 can be used in common with the shift register of the digital equalizer 47. Accordingly, a description will next be given of an embodiment in which at least a portion of the shift register within the digital highpass filter 44 is used in common with the digital equalizer 47.

Figure 12:
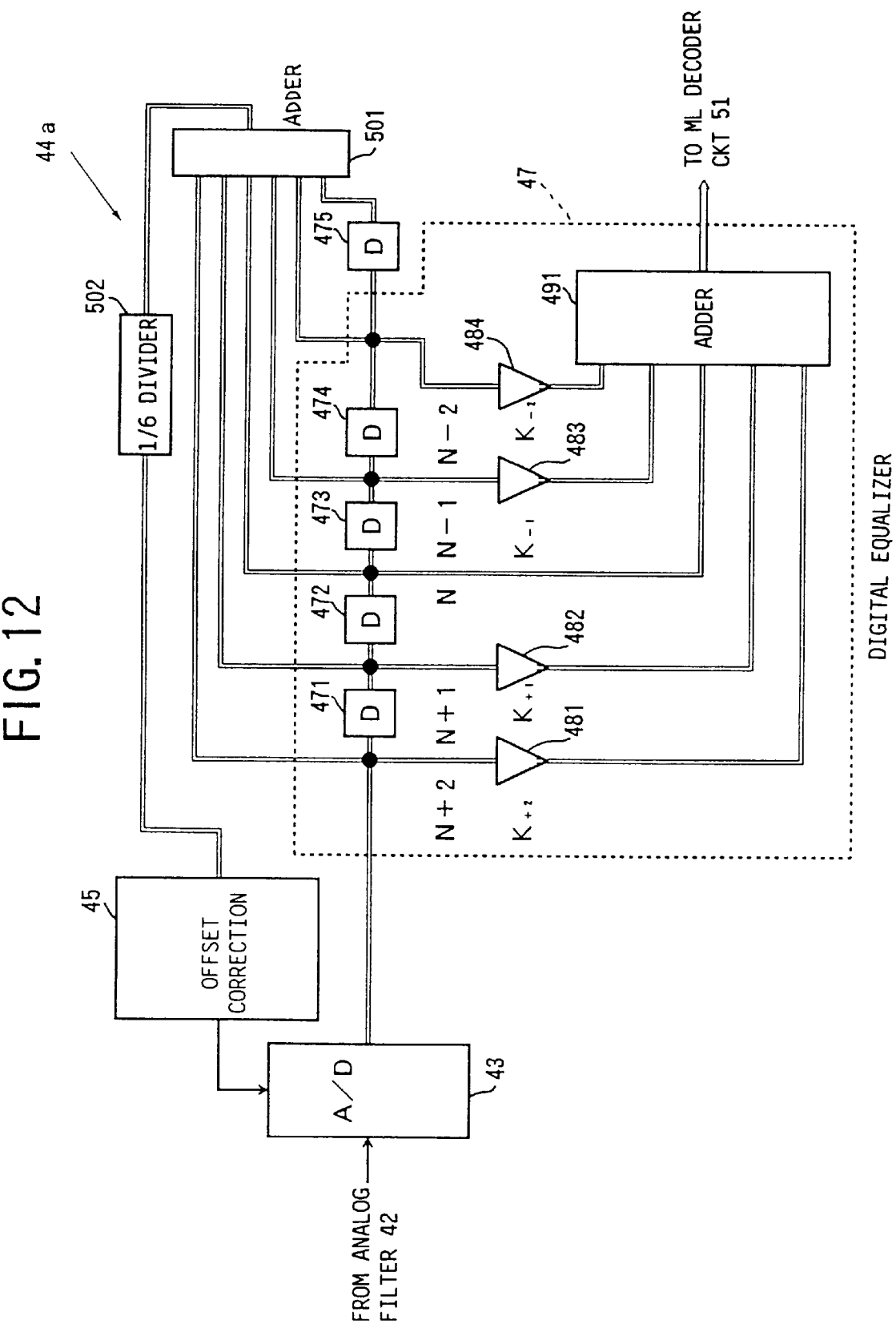
FIG. 12 is a system block diagram showing an embodiment of the digital highpass filter and the digital equalizer having a portion which is used in common between the two.

FIG. 12 shows the embodiment of the digital highpass filter 44 and the digital equalizer 47 having a portion which is used in common between the two. In FIG. 12, those parts which are the same as those corresponding parts in FIG. 11 are designated by the same reference numerals, and a description thereof will be omitted. In this embodiment, the circuit scale and the number of stages of the feedback loop are reduced by using a portion of the shift register of the digital highpass filter 44 in common with the shift register of the digital equalizer 47. In addition, it is also assumed in this embodiment for the sake of convenience that the A/D converter 43 is a 6-bit A/D converter.

In FIG. 12, out of the flip-flops 471 through 475 forming the shift register of the digital highpass filter 44, the flip-flips 471 through 474 are used in common with the shift register of the digital equalizer 47. For this reason, since the 6-bit A/D converter 43 is used in this embodiment, it is possible to omit 6×4=24 flip-flops compared to the case where the shift register of the digital highpass filter 44 and the shift register of the digital equalizer 47 are provided independently.

The reduction of the circuit scale realized by using the flip-flops in common between the digital highpass filter 44 and the digital equalizer 47 depends on the number of taps of the digital equalizer 47 and the number of stages of the shift register within the digital highpass filter 44.

Figure 13:
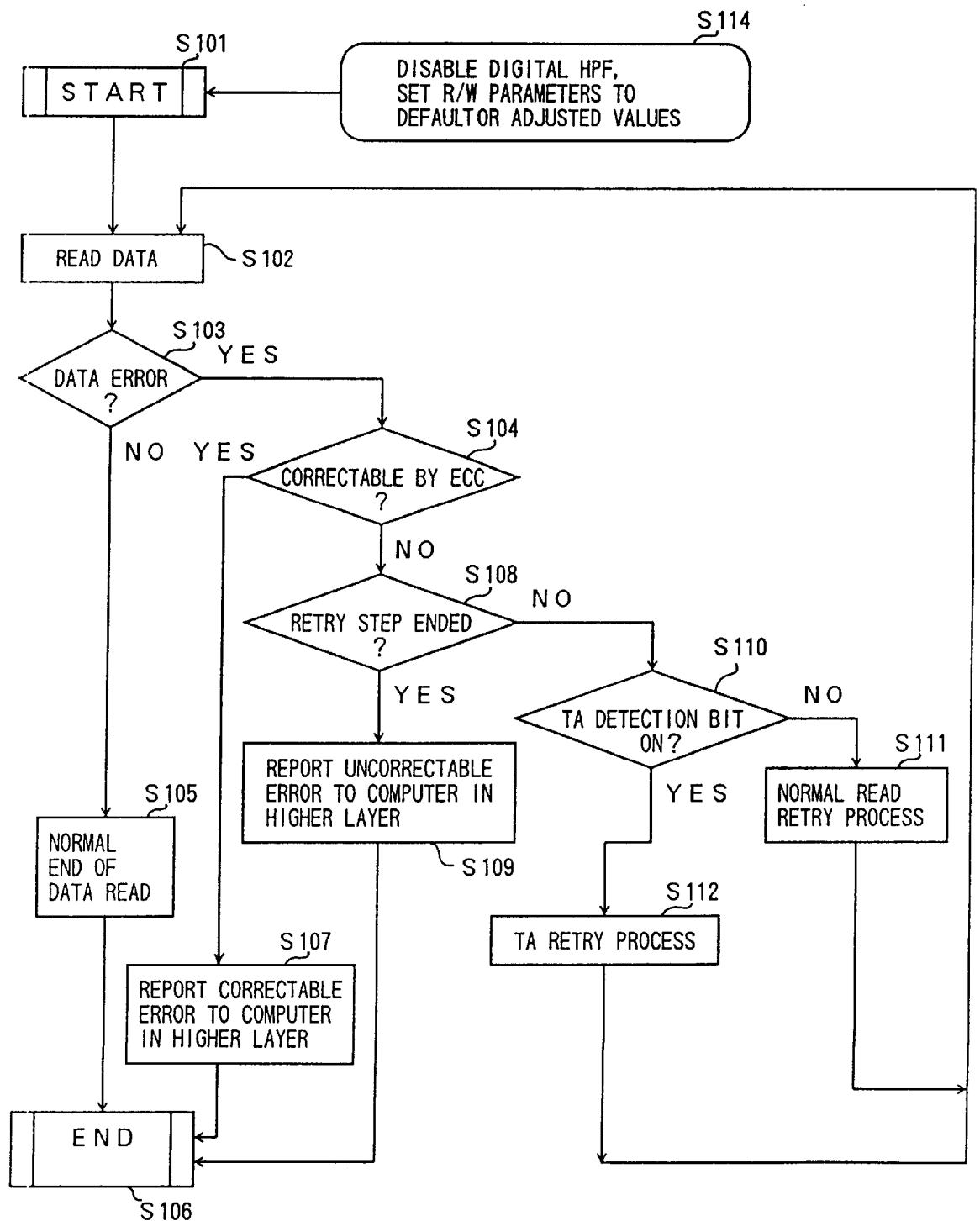
FIG. 13 is a flow chart for explaining an operation of a host microprocessor unit when carrying out a read retry.

Next, a description will be given of the embodiment of the retry method according to the present invention, by referring to FIGS. 13 and 14. FIG. 13 shows a flow chart for explaining the operation of the host MPU 32 shown in FIG. 1 when a read retry is carried out. In addition, FIG. 14 is a diagram for explaining a TA retry process in FIG. 13.

In FIG. 13, a step S101 starts the operation of the magnetic disk unit shown in FIG. 1. In this starting state, a step S114 disables the digital highpass filter 44 shown in FIG. 2 by the enable register 59, and sets read/write parameters to default values or adjusted values. A step S102 reads the data reproduced by the head 2. A step S103 decides whether or not a data error has occurred. If the decision result in the step S103 is NO, a step S105 judges that the data read has normally ended, and a step S106 ends the process.

On the other hand, if the decision result in the step S103 is YES, a step S104 decides whether or not the data error is correctable by an error correction code (ECC). If the decision result in the step S104 is YES, a step S107 reports the correctable error to the computer in the higher layer, and the step S106 ends the process.

If the decision result in the step S104 is NO, a step S108 decides whether or not a retry step has ended. If the decision result in the step S108 is YES, a step S109 reports the uncorrectable error to the computer in the higher layer, and the step S106 ends the process.

On the other hand, if the decision result in the step S108 is NO, a step S110 refers to the TA detection bit register 56 shown in FIG. 2 and decides whether or not the TA detection bit is ON, that is, set. If the decision result in the step S110 is NO, a step S111 carries out a normal read retry process. More particularly, the step S111 varies only the read/write parameters such as a sense current of the head 2 shown in FIG. 14, and disables the digital highpass filter 44 based on the contents of the enable register 59. During the normal read retry process, the setting of the digital highpass filter 44 is not changed. After the step S111, the process returns to the step S102.

In addition, if the decision result in the step S110 is YES, a step S112 carries out a TA retry process. More particularly, the step S112 changes the number of stages of the shift register within the digital highpass filter 44 based on the contents of the stage setting register 58. In addition, the step S112 changes the read/write parameters, similarly to the case when carrying out the normal read retry process. Furthermore, the step S112 enables the digital highpass filter based on the contents of the enable register 59. After the step S112, the process returns to the step S102.

In other words, when carrying out the TA retry process, the setting of the digital highpass filter 44 shown in FIG. 14 is also changed in addition to changing the read/write parameters shown in FIG. 14. In this embodiment, the setting of the digital highpass filter 44 includes the number of stages of the shift register and the enabled/disabled state of the digital highpass filter 44. In addition, the read/write parameters include the sense current of the head 2, an offset amount of the head 2, a center frequency Fc of the analog filter 42, a boost of the analog filter 42, and a Viterbi slice level of the ML decoder circuit 51. The combination of the parameters is set to an effective one within a range of 63 steps shown in FIG. 14.

Further, the present invention is not limited to these embodiments, but various variations and modifications may be made without departing from the scope of the present invention.

What is claimed is:

1. A thermal asperity compensation method comprising the steps of:
 (a) converting an analog signal reproduced from a magnetic recording medium into a digital signal using an analog-to-digital converter;
 (b) using a first digital filter to isolate a D.C. component caused by thermal asperity included in the analog signal and subtract said D.C. component from said digital signal after said step (a); and
 (c) supplying said D.C. component isolated in step (b) in a negative feedback to said analog-to-digital converter and subtracting a signal corresponding to said D.C. component from an input of said analog-to-digital converter and supplying said digital signal from which said D.C. component has been subtracted in step (b) to a second digital filter for equalizing said digital signal.

2. The thermal asperity compensation method as claimed in claim 1, wherein said step (a) further includes detecting said thermal asperity, and said steps (b) and (c) are performed only when said thermal asperity is detected in said step (a).

3. A magnetic disk unit comprising:
 analog-to-digital converter means for converting an analog signal reproduced from a magnetic disk into a digital signal;
 first digital filter means for isolating and outputting a D.C. component caused by thermal asperity included in said analog signal from said digital signal, and for subtracting said isolated D.C. component from said digital signal and outputting said digital signal without said D.C. component;
 correction means for supplying said isolated D.C. component output by said first digital filter means in a negative feedback to said analog-to-digital converter means and subtracting a signal corresponding to the D.C. component from an input of said analog-to-digital converter means; and
 second digital filter means for receiving and equalizing said digital signal without said D.C. component output by said first digital filter means.

4. The magnetic disk unit as claimed in claim 3, further comprising:
 detection means for detecting the thermal asperity based on said digital signal, said first digital filter means subtracting said D.C. component from said digital signal only when said detection means detects the thermal asperity.

5. The magnetic disk unit as claimed in claim 3, wherein said first digital filter means comprises:
 a shift register having n stages and receiving said digital signal, where n is an integer;
 subtracter means for obtaining a difference between an output of said shift register and said digital signal;
 an accumulator accumulating the difference output from said subtracter means; and
 divider means dividing an accumulated result output from said accumulator by n.

6. The magnetic disk unit as claimed in claim 5, further comprising:
 means for variably setting said n with respect to said shift register and said divider means.

7. The magnetic disk unit as claimed in claim 3, further comprising:
 an automatic gain control loop carrying out an automatic gain control based on an output of said first digital filter means;
 a phase locked loop carrying out a phase locked control based on the output of said first digital filter means; and
 decoder means for decoding said digital signal based on outputs of said automatic gain control loop, said phase locked loop and said second digital filter means.

8. The magnetic disk unit as claimed in claim 7, wherein said first digital filter means has a first shift register, said second digital filter means has a second shift register, and at least a portion of the first shift register is used in common with said second shift register.

9. The magnetic disk unit as claimed in claim 3, which further comprises:
 first detection means for detecting a data error based on said digital signal; and
 second detection means for detecting the thermal asperity based on said digital signal,
 said first digital filter means eliminating said D.C. component only when said first detection means detects the data error and said second detection means detects the thermal asperity.

10. The magnetic disk unit as claimed in claim 9, which further comprises:
 retry means for carrying out a read retry process based on whether or not said second detection means detects the thermal asperity when said first detection means detects the data error.

11. A retry method for an apparatus which includes analog-to-digital converter means for converting an analog signal reproduced from a magnetic recording medium into a digital signal, a digital filter for eliminating a D.C. component caused by thermal asperity included in the analog signal from an output of said analog-to-digital converter means and a digital equalizer for equalizing a digital signal output by the digital filter, said retry method comprising the steps of:
 (a) detecting a data error based on the digital signal;
 (b) detecting the thermal asperity based on the digital signal; and
 (c) carrying out a read retry process when the data error is detected and the thermal asperity is not detected and a thermal asperity retry process using said digital filter when both said data error and said thermal asperity are detected.

12. A thermal asperity compensation method comprising the steps of:

obtaining a D.C. component of a digital signal from an output of an analog-to-digital converter and subtracting said D.C. component from said digital signal using a first digital filter;

outputting said D.C. component to means for converting said D.C. component into a voltage, and said digital signal without said D.C. component to a second digital filter for equalizing said digital signal; and controlling an input dynamic range of an input to said analog-to-digital converter by subtracting said voltage from said input.

13. A magnetic disk unit comprising:

first digital filter means for obtaining a D.C. component of a digital signal from an output of an analog-to-digital converter and for subtracting said D.C. component from said digital signal;

offset correction means for converting said D.C. component to a voltage;

subtracter means for obtaining a difference between said voltage and an input of said analog-to-digital converter to control an input dynamic range of said input; and second digital filter means for equalizing said digital signal from which said D.C. component has been subtracted.

* * * * *